United States Patent
Fleck et al.

(10) Patent No.: US 7,630,480 B2
(45) Date of Patent: Dec. 8, 2009

(54) SERVICE PROVISIONING SYSTEM

(75) Inventors: Andreas Fleck, Falkensee (DE); Jan Dehnel, Berlin (DE); Jan Hohndorf, Berlin (DE); Frank Mayr, Berlin (DE)

(73) Assignee: Alcatel, Paris (FR)

( * ) Notice: Subject to any disclaimer, the term of this patent is extended or adjusted under 35 U.S.C. 154(b) by 926 days.

(21) Appl. No.: 11/059,603

(22) Filed: Feb. 17, 2005

(65) Prior Publication Data
US 2005/0207553 A1  Sep. 22, 2005

(30) Foreign Application Priority Data
Mar. 18, 2004 (EP) .................................. 04290732

(51) Int. Cl.
*H04M 3/42* (2006.01)
(52) U.S. Cl. .............................. 379/201.12; 379/88.17; 379/201.01; 379/221.08; 455/419; 709/226
(58) Field of Classification Search ............ 379/201.12, 379/15.03, 88.17, 201.01, 221.08; 455/419; 709/226
See application file for complete search history.

(56) References Cited

U.S. PATENT DOCUMENTS

| | | | | |
|---|---|---|---|---|
| 5,353,339 | A * | 10/1994 | Scobee ................... | 379/201.12 |
| 5,530,855 | A | 6/1996 | Satoh et al. | |
| 5,579,384 | A | 11/1996 | Seymour | |
| 5,883,946 | A * | 3/1999 | Beck et al. ............. | 379/201.12 |
| 5,883,948 | A * | 3/1999 | Dunn ..................... | 379/221.09 |
| 5,896,441 | A | 4/1999 | Akazawa et al. | |
| 6,088,434 | A * | 7/2000 | Kasrai ................... | 379/201.12 |
| 6,122,362 | A * | 9/2000 | Smith et al. ............ | 379/230 |
| 6,226,374 | B1 * | 5/2001 | Howell et al. .......... | 379/221.08 |
| 6,275,570 | B1 * | 8/2001 | Homan et al. ........... | 379/88.17 |
| 6,314,172 | B1 * | 11/2001 | Nightingale ............ | 379/201.12 |
| 6,389,126 | B1 * | 5/2002 | Bjornberg et al. ....... | 379/201.03 |
| 6,396,917 | B1 * | 5/2002 | Brush et al. ............ | 379/201.12 |

(Continued)

FOREIGN PATENT DOCUMENTS

EP  0 593 062 A2  4/1994

OTHER PUBLICATIONS

U.S. Appl. No. 11/059,477, filed Feb. 17, 2005, entitled "Data Synchronization Method.".

(Continued)

*Primary Examiner*—Gerald Gauthier
(74) *Attorney, Agent, or Firm*—Harness, Dickey & Pierce (57) ABSTRACT

The invention concerns a method of providing service data towards a set of two or more network elements (31 to 35) of a telecommunication network (1), as well as a service provisioning system (2) and a computer program product for executing this method. The service provisioning system (2) receives a plurality of change requests for said service data, the change request concerning one or more of the network elements of the telecommunication network (1). The service provisioning system (2) analyzes the dependencies of two or more received change requests and/or corresponding network elements specific update requests with respect to service data. Then, it aggregates independent change requests and/or update requests and transmits one or more concurrent update commands that force a parallel execution of the aggregated change requests and/or update requests to one or more network elements of the telecommunication network (1).

9 Claims, 4 Drawing Sheets

U.S. PATENT DOCUMENTS

| | | | |
|---|---|---|---|
| 6,411,697 B1 * | 6/2002 | Creamer et al. | 379/201.12 |
| 6,510,216 B1 * | 1/2003 | Burr et al. | 379/201.12 |
| 6,546,094 B1 * | 4/2003 | Turner et al. | 379/201.12 |
| 6,546,095 B1 * | 4/2003 | Iverson et al. | 379/201.12 |
| 6,674,840 B1 * | 1/2004 | Contractor | 379/15.03 |
| 6,687,356 B1 * | 2/2004 | Glitho et al. | 379/201.12 |
| 6,778,821 B1 * | 8/2004 | Shunk | 455/419 |
| 6,823,395 B1 * | 11/2004 | Adolfsson | 709/242 |
| 6,853,715 B2 * | 2/2005 | Flanagan | 379/201.12 |
| 6,947,989 B2 * | 9/2005 | Gullotta et al. | 709/226 |
| 6,990,186 B2 * | 1/2006 | Thacker | 379/201.12 |
| 6,999,570 B2 * | 2/2006 | Alcott | 379/207.02 |
| 7,352,853 B1 * | 4/2008 | Shen et al. | 379/201.12 |
| 7,356,136 B2 * | 4/2008 | Eshun et al. | 379/201.12 |
| 2002/0116457 A1 | 8/2002 | Eshleman et al. | |
| 2004/0022379 A1 * | 2/2004 | Klos et al. | 379/201.01 |
| 2005/0170826 A1 * | 8/2005 | Florkey et al. | 455/419 |

OTHER PUBLICATIONS

Kusaura N et al: "Distribution of service data to distributed SCPs in the advanced IN" Nov. 13, 1995, Global Telecommunications Conference, 1995. Conference Record. Communication Theory Mini-Conference, Globecom 1995., IEEE Singapore , Nov. 13-17, 1995, New York, NY, USA, IEEE, US, pp. 1272-1276, XP010164427.

Lautenschlager W et al Pinnacle Group: "Routing Service for the Provision of Number Protability." ISS 1997, World Telecommunications Congress. (International Switching Symposium). Global Network Evolution: Convergence or Collision? Toronto, Sep. 21-26, 1997, ISS. World Telecommunications Congress. (International Switching Symposium), Toronto, P, vol. vol. 2, Sep. 21, 1997, pp. 235-242, XP000704473.

* cited by examiner

SERVICE PROVISIONING SYSTEM

TECHNICAL FIELD

The present invention relates to a method of providing service data towards a set of two or more network elements of a telecommunication network, wherein a service provisioning system receives a plurality of change requests for said service data, the change requests concerning one or more of the network elements of the set of network elements, and transmits update commands relating to the change requests to one or more network elements of the set of network elements. The present invention further relates to a service provisioning system and a computer program product for executing this method.

The invention is based on a priority application, EP 04290732.9, which is hereby incorporated by reference.

BACKGROUND OF THE INVENTION

Today's telecommunication systems provide a wide range of routing and enhanced services that are managed, controlled and executed in a distributed way. Consequently, the handling and updating of service data in such a distributed environment becomes of growing importance.

For example, U.S. Pat. No. 5,896,441 describes a communication state management system implementing an updating functionality within an intelligent network. This network is composed of electronic switches called SSPs (Service Switching Points) and servers called SCPs (Service Control Points). Each of the SSPs is intended to transfer service requests from a subscriber to a service control network to control the communications network according to an instruction given by the service control network. Each of the SCPs includes an integrated data base which normally stores subscriber information, network configuration information, service control software and so on and integrates communication service capabilities such as communication processing capability, service providing capability, path selecting and control capability and so on. This data base includes management tables in order to provide number conversion services. Such services convert an "IN telephone number", which is a virtual number, to a "telephone number" that is a telephone number of a normal subscriber. The SCPs update the communication states of the converted telephone number upon update requests from corresponding SSPs. If a fault occurs in the link between an SCP and SSP, the SSP recognizes the link and newly establishes a link between the SCP and itself. After that, the SCP inquires the SSP about the communication states of the subscriber, registered in said SSP. Thereby, the system implements a central and sequential update mechanism that uses translation tables.

SUMMARY OF THE INVENTION

It is the object of the present invention to provide an improved update mechanism for service data of a communication network.

The object of the present invention is achieved by a method of providing service data towards a set of two or more network elements of a telecommunication network, in particular to a set of two or more signaling transfer points, wherein the method comprising the steps of: receiving a plurality of change requests for said service data, the change requests concerning one or more of the network elements of the set of network elements, analyzing the dependencies of two or more change requests and/or corresponding network elements specific update requests with respect to service data; aggregating independent change requests and/or update requests; and transmitting from the service provisioning system to one or more network elements of the set of network elements one or more concurrent update commands that forces a parallel execution of the aggregated change requests and/or update requests. The object of the present invention is further achieved by a service provisioning system for providing service data towards the set of two or more network elements of a telecommunication network, wherein the service provisioning system comprises communication means for receiving a plurality of change requests for the service data, the change request concerning one or more of the network elements of the set of network elements, communication means for transmitting update commands relating to the change request to one or several network elements of the set of network elements, and a control unit for analyzing the dependencies of two or more change requests and/or corresponding network elements specific update requests with respect to service data, aggregating independent change requests and/or update requests, and transmitting to one or more network elements of the set of network elements one or more concurrent update commands that forces a parallel execution of the aggregated change requests and/or update requests. The object of the present invention is further achieved by a computer program product that executes the aforementioned method when executed by a service provisioning system.

The present invention efficiently forces consistency in a distributed system of heterogeneous network elements, in particular heterogeneous signaling transfer points, and a central service provisioning system. The service provisioning system is used to provide network wide valid service data towards the network elements. It is responsible to keep consistency between its own master-data base and the data bases of the network elements. The number of change requests that can be executed by the service provisioning system per time interval is strongly influenced by the response time of the network elements which is typically in a range between 1 and 2 seconds. Thanks to the invention, the number of change requests that can be processed by the service provisioning system can seriously be improved while keeping the consistency between the masters-data base and the data bases of the network node. The invention provides a consistent and fast handling of update commands within a telecommunication network having a plurality of network elements sharing network wide service data of the telecommunication network. Further, it lowers complexity of exception handling within such environment and supports the use of different network management systems at the network elements of the telecommunication network as well as the service provisioning system. Thereby, it allows an efficient run of updating processes within such environment.

Further advantages are achieved by the embodiments of the invention indicated by the dependent claims.

According to a preferred embodiment of the invention, the method is applied on change requests that concern a group of signaling transfer points of the telecommunication network. Such signaling transfer points control the routing of calls within the telecommunication network and assigns telephone numbers to physical addresses of network resources and thereby guiding the call establishment through the communication network. The service provisioning system updates the routing tables of these signaling transfer points to implement a number portability feature within the telecommunication network.

For example, the telecommunication network is split between different network operators wherein two or more competitive network operators offer their services within the same local area. To enable a fair competition between such competitive network operators, it should be possible for the subscriber to keep his telephone number when changing from one network operator to another network operator. This feature is realized by means of a service data provisioning method according to the invention providing service data towards the signaling transfer points.

The service provisioning system holds a master data base keeping the overview of the routing process implemented by the signaling transfer points. In case of receiving a change request requesting the portation of a subscriber from one network operator to another network operator, the service provisioning system identifies the signaling transfer points which has to update their routing tables for implementing this portation. Then, it transmits update commands to these signaling transfer points. The update commands contain number portability data for updating the routing tables of the signaling transfer points.

To keep consistency between the master-data base and the routing tables of the signaling transfer points is a serious point in such environment. The results of the processing of commands depend on the sequence of the processing and the service provisioning system is confronted with a long average response time, for example an average response time of the signaling transfer points between one and two seconds. Thanks to the invention, it becomes possible to execute several commands in parallel while keeping the necessary sequence of processing which drastically improves the throughput of change request within this distributed system.

But it is also possible to apply the invention to another kind of provisioning of network wide service data towards network elements of a telecommunication network element.

Preferably, the service provisioning system executes, when receiving a change request, a corresponding change in a service data master-data base hold by the service provisioning system. Then, the service provisioning system identifies one or more network elements of the set of network elements the change request is of relevance for. For example, it identifies the signaling transfer points that are influenced by a change of the routing process of the telecommunication network requested by the change request. Then, it creates a corresponding update request for each relevant network element. This corresponding update request specifies the necessary changes of service data kept by the respective network element, for example the necessary changes of the routing tables of the respective signaling transfer point. The use of a service master-data base supports the service provisioning system in keeping the consistency of the distributed service data.

Preferably, the service provisioning system commits a change in the master-data base if all relevant network elements have processed the corresponding update request. This ensures that the data hold by the network elements and the data of the service data master-data base are consistent.

According to a preferred embodiment of the invention, the service provisioning system aggregates equivalent independent change requests and/or update requests with respect to the context of the plurality of change requests. The service provisioning system may aggregate several groups of independent change requests in parallel wherein each of these groups contain equivalent independent change requests with respect to the context of the plurality of change requests. Then, it transmits an update command that forces a parallel execution of the aggregated equivalent change request and/or update requests. Thereby, the number of update commands resulting from the change requests and/or update requests are reduced which results in a further improvement of speech.

Further, a parallel processing of the aggregated independent change request and/or update requests by the service provisioning system with multi-session data base updates is proposed. This approach guarantees further improvements with regard to change request throughput.

According to a preferred embodiment of the invention, two or more task processes of the service provisioning system work in parallel for concurrently processing the aggregated independent change requests and/or update requests. Further, a task distributor checks whether a change request and/or update request is dependent on a change request and/or update request already processed by one of the task processes or already stored in a task processor command queue assigned to one of the task processes. The task distributor puts the change requests and/or the update request in the task processor command queue of this task processor, if it detects such dependency. This procedure guarantees a fast and efficient implementation of the service data provisioning method according to the invention.

BRIEF DESCRIPTION OF THE DRAWINGS

These as well as further features and advantages of the invention will be better appreciated by reading the following detailed description of presently preferred exemplary embodiments taken in conjunction with the accompanying drawings in which.

DETAILED DESCRIPTION OF THE INVENTION

Figure 1:
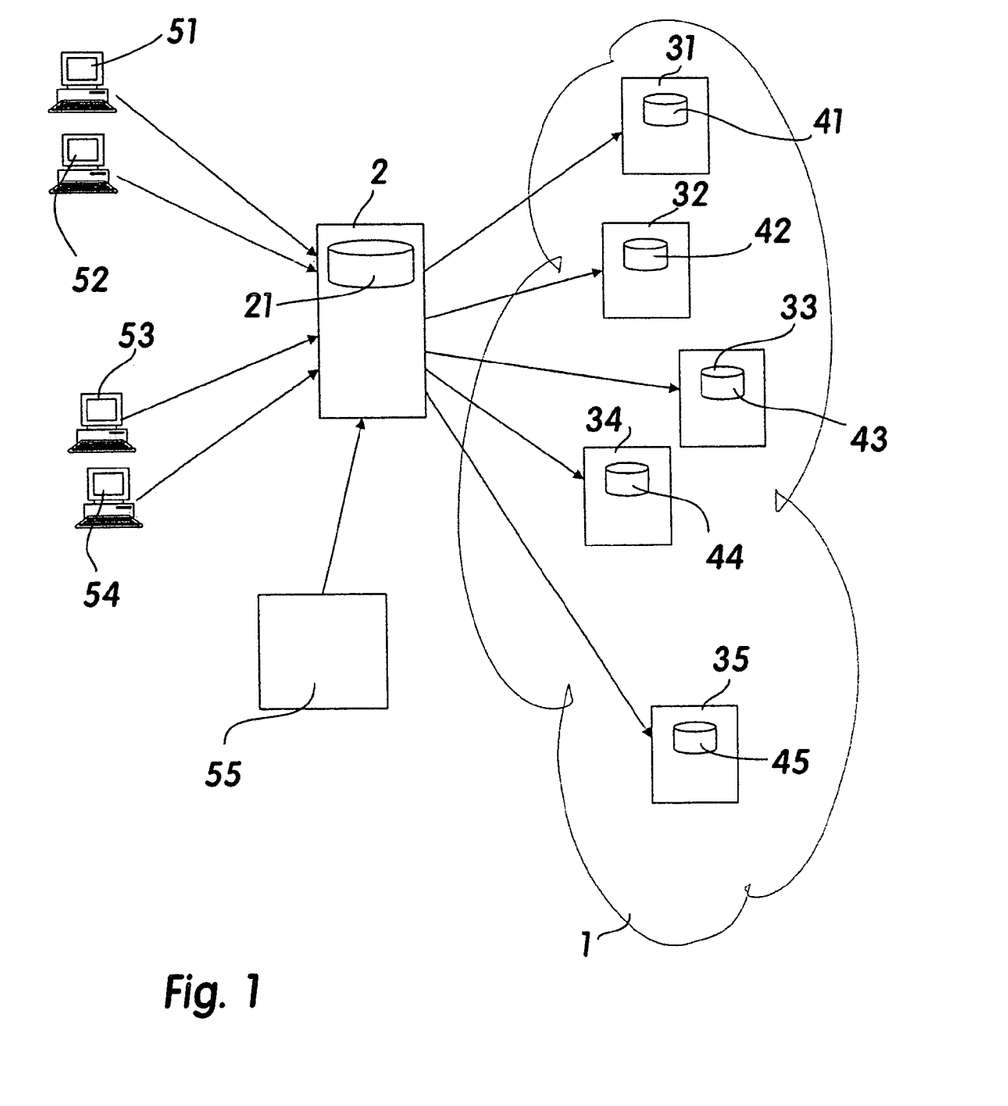
FIG. 1 is a block diagram of a telecommunication system showing a plurality of network elements and a service provisioning system according to the invention.

FIG. 1 shows a telecommunication system with a telecommunication network 1, a service provisioning system 2, several terminals 51 to 54 and a server 55.

The telecommunication network 1 is a telephone network, preferably a PSTN network or an ISDN network (PSTN=Public Switched Telecommunication Network; ISDN=Integrated Services Digital Network). But it is also possible that the telecommunication network 1 is a wireless communication network, for example a cellular network as a GSM or UMTS network (GSM=Global System for Mobile Communication; UMTS=Universal Mobile Telecommunication System). Further, it is also possible that the telecommunication network 1 is a communication network capable to transmit data traffic or voice, video and data traffic in parallel. The telecommunication network 1 may be composed of several sub-networks assigned to different network operators.

The telecommunication network 1 is composed of a plurality of network elements providing transmission, routing and enhanced service functions within the telecommunication network 1. As an example, FIG. 1 shows five of such network elements, namely the five signaling transfer points 31, 32, 33, 34 and 35.

Each of the signaling transfer points 31 to 35 has a routing data base 41, 42, 43, 44 and 45, respectively. These routing data bases store the translation tables for mapping telephone numbers to physical routing addresses. The signaling transfer points 31 to 35 provide such mapping service for each call it is responsible for.

The service provisioning system 2 is composed of a computer or several interlinked computers that have a communication interface to communicate with the network elements 31 to 35 of the telecommunication system 1. The service provisioning system 2 can be part of the network management infrastructure of the telecommunication network 1. But the service provisioning system 2 is preferably formed by a stand-alone server that is responsible for the update of network wide service data without being an integral part of the network management systems of the network operators responsible for the network elements 31 to 35.

The service provisioning system 2 comprises a data base 21 which is a service data master-data base keeping the overview of the distributed service data administrated by the routing data bases 41 to 45 of the network elements 31 to 35.

The service provisioning system 2 receives change requests concerning the aforementioned distributed service data from the terminals 51 to 54 and from the server 55. The terminals 51 to 54 represent operator terminals of (different) network operators which are responsible for the telecommunication network 1 or a part of the telecommunication network 1. The terminals 51 to 54 are used by these network operators to initiate changes in the service data of the telecommunication network 1 that are for example triggered by the change of a subscriber from one network operator to another network operator. The agents of the network operator input these data in the terminal 51 to 54 and the respective terminal forwards the inputted change request to the service provisioning system 2. Besides this possibility to input such search request via a human machine interface, it is also possible that these change requests are automatically generated by a server of one of the involved network operators or by a server of a third party. This possibility is indicated by the server 55 which transmits change requests to the service provisioning system 2.

The service provisioning system 2 receives from the terminals 51 to 54 and the server 55 a plurality of change requests for service data used by network elements of the telecommunication network 1. The service provisioning system 2 analyzes the dependencies of two or more of these change requests with respect to the service data and aggregates independent change request. Then, it transmits update commands relating to the change request to one or several network elements of the telecommunication network 1. These update commands trigger the network elements to execute the necessary changes of the distributed service data. Thereby, the service provisioning system 2 controls the sequence of transmission of the update commands by means of the aforementioned analyzation and aggregation steps. It transmits one or more concurrent update commands to the network elements that forces a parallel execution of the aggregated change requests.

The invention is not limited to the update of routing tables of signaling transfer points but may be applied to all updating processes necessary to update service data within the telecommunication network 1.

Details of a preferred embodiment of the invention are in the following exemplified by means of the FIGS. 2 and 3.

Figure 2:
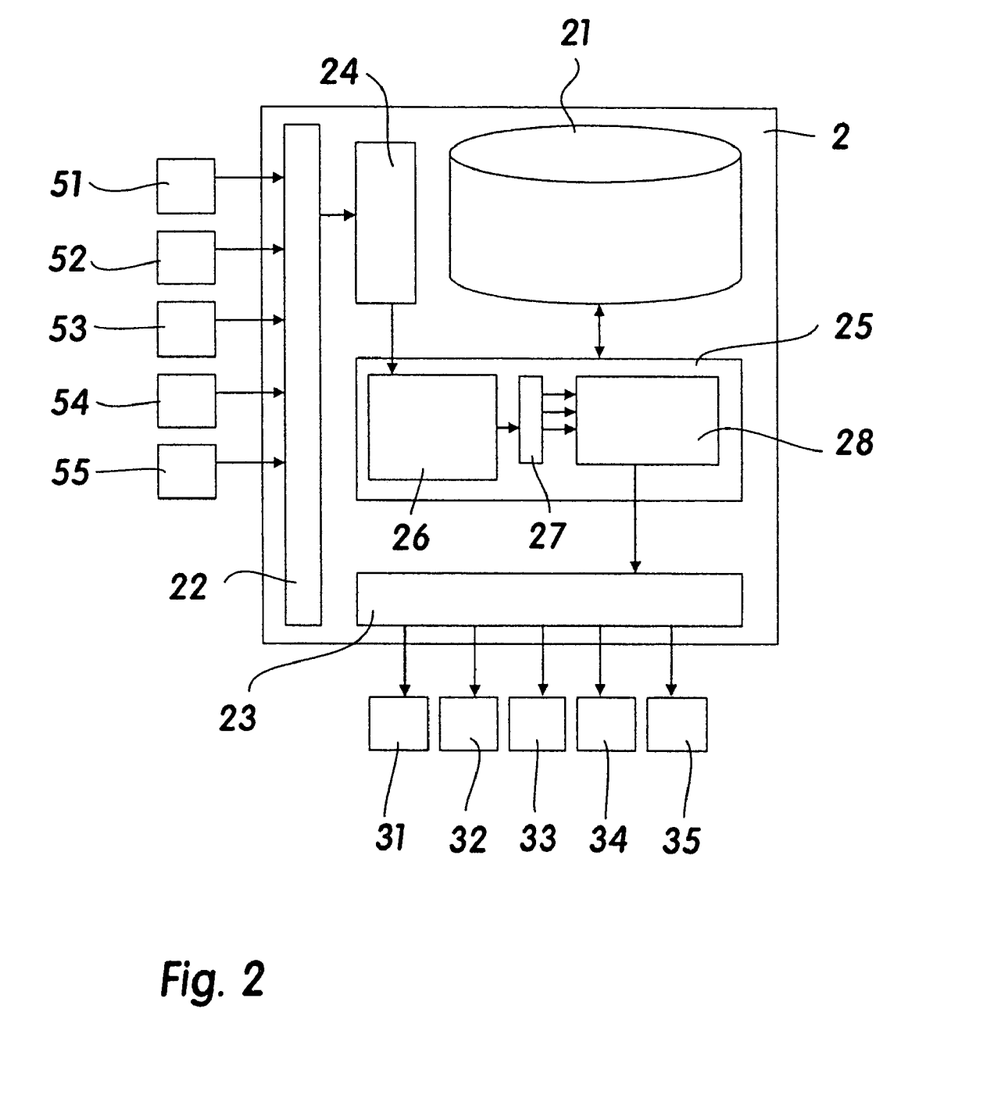
FIG. 2 is a block diagram showing details of the service provisioning system of FIG. 1.

FIG. 2 shows a detailed view of the service provisioning system 2. As already mentioned above, the service provisioning system 2 is constituted by one or several interlinked computers, a software platform and various application programs executed by this hardware platform. The functionalities of the service provisioning system 2 are provided by the execution of these software programs on the system platform of the service provisioning system 2. The application programs responsible for the control of the functionalities (as described in the following), forms as such, or stored on a computer readable storage medium, a computer program product according to the invention.

From a functional point of view, the service provisioning system 2 comprises communication units 22 and 23, the data base 21, storage means 24 and a control unit 25.

The communication unit 22 provides the necessary communication services for supporting the communication between the terminals 51 to 54 and the service provisioning system 2 as well as the communication between the server 55 and the service provisioning system 2. Preferably, an IP-based network connects the terminals 51 to 54 and the server 55 with the service provisioning system 2. For example, the terminals 51 to 54 are connected with the service provisioning system 2 via a LAN (LAN=Local Area Network). For example, the server 55 is connected with the service provisioning server 2 via the Internet. In such case, the communication unit 22 comprises the necessary functionalities for executing the TCP/IP protocols stack (IP=Internet Protocol; TCP=Transmission Control Protocol), as well as the necessary hardware components of this communication service.

The communication unit 23 provides the necessary communication services for supporting the communication between the service provisioning system 2 and the network elements 31 to 35. For example, the service provisioning system 2 is connected with the network elements 31 to 35 via a CMISE based interface or via another kind of network management based control interface (CMISE=Common Management Information Service Element). In such case, the communication unit 23 provides the necessary functionalities for executing the protocol stack of the respective network management protocol and the underlying communication protocols (for example OSI-based protocols or IP-based protocols). The communication protocols used for communicating with the network elements 31 to 35 may differ from network element to network element. Further, the network elements 31 to 35 may be assigned to different network operators or may be formed by different kinds of network elements. In such environment, the communication unit 23 provides additional mediation functionalities to perform a correct data mapping between the service provisioning system 2 and the network elements 31 to 35.

Alternatively, it is possible that the service provisioning system 2 communicates via an (individual) simple command interface with the network elements 31 to 35 and the communication unit 23 comprises the necessary functionalities to execute the communication protocols used for these communications.

The change requests received from the terminals 51 to 54 and from the server 55 are buffered in the storage unit 24 according to their time of arrival.

The control unit 25 comprises two procedures 26 and 28 and a storage unit 27.

The procedure 26 is fed by the arrived change requests buffered in the storage unit 24. The procedure 26 executes for each arrived change request a corresponding change in the data base 21. Then, the procedure 26 identifies by the overview of the service data provided by the data base 21 these network elements of the telecommunication network 1 which has to be contacted by a change command to implement the changes of the service data specified in the received change request. Further, it determines the content of the changes which has to be executed in the respective data bases of these network elements and creates corresponding update requests for each of these network elements. For example, the procedure 26 comes to the result that service data stored in the data bases 41, 42 and 45 of the network elements 31, 32 and 35 has to be amended and creates in the following three corresponding update requests specifying changes which have to be carried out in the data bases 41, 42 and 45.

Then, the procedure 26 stores the created update requests in the storage unit 27, which is for example formed by a buffer memory.

Further, it is possible that the procedure 26 replays a confirmation message to the terminal or server which has created the change request, as soon as the changes specified in the change requests are executed in the data base 21.

According to a preferred embodiment of the invention, the procedure 26 executed additional functionalities scanning for acknowledgment messages received from the network elements 31 to 35 and confirming the successful execution of update commands by the respective network element. For example, the procedure 26 evaluates such acknowledgment massages, assigns these messages to changes performed in the data base 21 and commits a change in the data base 21, if all relevant network elements have processed the corresponding update requests and has committed this by a respective acknowledgment message.

The procedure 28 analyzes the dependencies of the update requests stored in the storage unit 27. Further, it controls the aggregation of independent update requests in the storage unit 27 and the sequence of transmission of the update requests to the respective network elements.

For example, this dependency analysis can be done for provisioning of default number ranges and exception number entries by checking the specific numbers and number ranges whether they overlap each other. If in two commands overlapping or identical numbers or number ranges are specified, the commands are dependent and the sequence of execution has to be kept.

In general, the procedure 28 checks for each update request stored in the storage unit 27 whether a specific sequence of execution has to be kept to prevent that the result of the processing of the commands deviate from the processing of the command according to the sequence the change requests received by the service provisioning system 2. Such analysis normally needs one or several access to the data base 21 for checking the dependencies between the service data treated by the update commands kept in the storage unit 27. Preferably, an iterative algorithm is applied to analyze these dependencies.

The size of the storage unit 27 determines the computation efforts necessary for performing the dependency analysis and the improvement in speech achievable by the invention. Preferably, the storage unit 27 stores a number of update commands that corresponds to ten or twenty change requests.

The procedure 28 aggregates the independent update requests and transmits the aggregated independent change requests as concurrent update commands to the network elements 31 to 35 which forces a parallel execution of the aggregated change requests.

Figure 3:
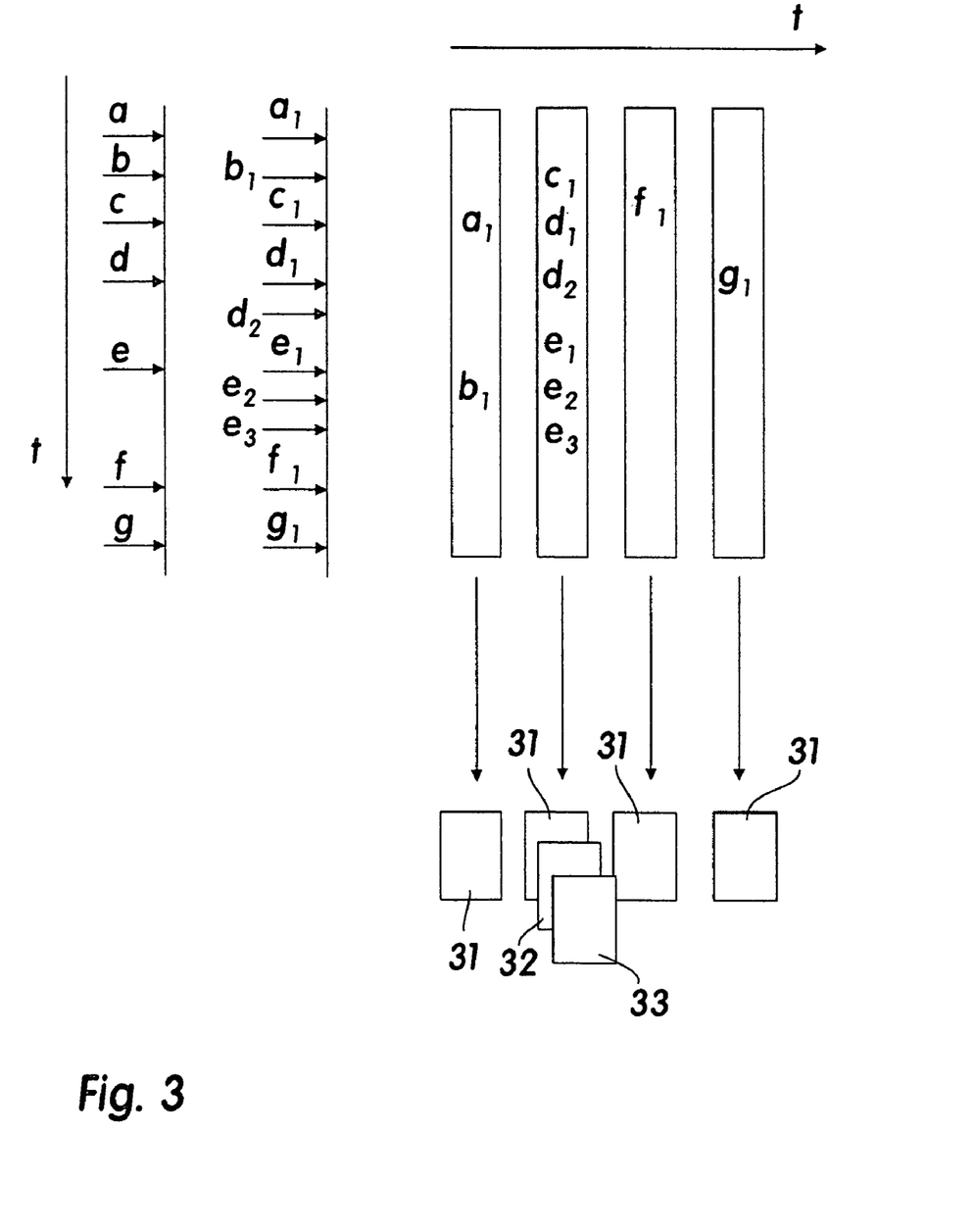
FIG. 3 is a functional diagram for exemplifying the service data provisioning method according to the invention.

For example, FIG. 3 shows several change requests a to g received by the procedure 26. The procedure 26 creates corresponding update requests $a_1$ to $g_1$ which are stored in the storage unit 27 in the order shown in FIG. 3. The procedure 28 executes a dependency analyzing algorithm, wherein the procedure 28 came to following results: The execution of the update commands $e_2$, $e_3$ and $g_1$ depends on the execution of the update command $f_1$. The execution of the update commands $f_1$ depends on the execution of the update commands $c_1$, $d_1$, $d_2$ and $e_1$. Further, the execution of the update commands $c_1$, $d_1$, $d_2$ and $e_1$ depends on the execution of the update commands $a_1$ and $b_1$. Therefore, it is possible to aggregate the update commands $a_1$ and $b_1$, $c_1$, $d_1$, $d_2$ and $e_1$ and $e_2$, $e_3$ and $g_1$, respectively. The result of this aggregation process is illustrated by FIG. 3.

FIG. 3 shows the respective groups of independent update requests wherein the members of each group may be executed concurrently without influencing the result of processing. Consequently, the procedure 28 first transmits the update commands $a_1$ and $b_1$ to the network element 31 in parallel, then transmits the update request $c_1$, $d_1$, $d_2$, $e_1$, $e_2$ and $e_3$ to the network elements 31 and 32 in parallel, then transmits the updates request $f_1$ to the network element 31 and then transmits the update request $g_1$ to the network element 31. Further, it is possible that the control unit 25 does not apply the analyzing, aggregation and parallel execution steps to the update requests generated by the procedure 26, but applies these steps to the change request received from the terminals 51 to 54 and from the server 55. In such case, the procedure 28 is applied to the change requests buffered in the memory unit 24 and the steps of the procedure 26 are applied to the change requests when they are ready to be executed.

A further preferred implementation of the procedure 28 is in the following exemplified by means of FIG. 4.

Figure 4:
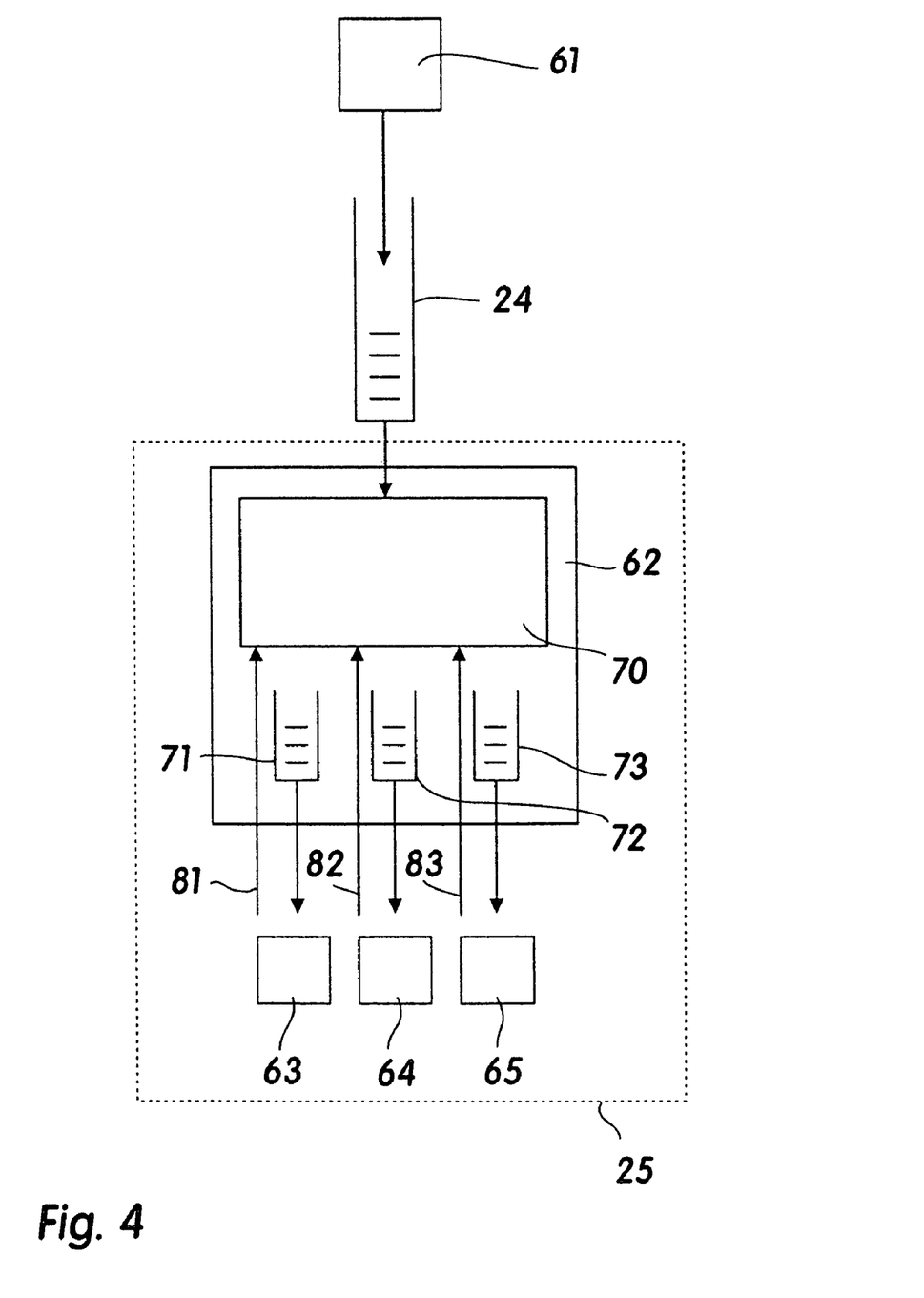
FIG. 4 is a block diagram showing details of a service provisioning system according to a further embodiment of the invention.

According to the embodiment of FIG. 4, threads are used to implement the concurrency.

FIG. 4 shows a process 61, a task distributor 62 and several task processes 63 to 65. The task distributor 62 and the task processes 63 to 65 implement the functionalities of the control unit 25 of FIG. 2. Further, FIG. 4 shows a command queue 24 which performs the functionality of the storage unit 24 of FIG. 3.

The process 61 is implemented by a thread that receives the change requests from the terminals 51 to 54 and the server 55 and puts them into the command queue 24.

A fixed number of task processor threads per application process handles the change requests stored in the command queue 24. These threads are represented by the task processes 63 to 65 of FIG. 4. A task distributor class manages the command queue 24 and ensures the compliance with the restrictions concerning the dependencies of the change requests, i.e. it guarantees that change requests which have to be processed in sequence will also be processed this way. This task distributor class is represented by the task distributor 62 of FIG. 4. The task distributor 62 internally has one command queue per task process that will be used. Consequently, the task distributor 62 of FIG. 4 has three command queues 71, 72 and 73 assigned to the task processes 63, 64 and 65, respectively. Further, the task distributor 62 has a pop-task operation 70 that controls the transfer of change requests stored in the command queue 24 to the command queues 71 to 73 of the task processes 63 to 65.

When the task distributor 62 detects a new change request stored in the command queue 24 it checks whether it is dependent on a change request a certain one of the task processes 63 to 65 just processing or which is already in the task process related command queue 63, 64 or 65 of a certain task process. If that is the case, this new command will be put into the command queue of this task process.

When one of the task processes 63 to 65, for example the task process 63, invokes the pop-task operation 70 of the task distributor 62, the following procedure will be performed.

The pop-task operation 70 checks whether there are change requests in the internal command queue assigned to the task process 63 and returns the first change request of this command queue if it is there. If the command queue 71 of the task process 63 is empty it accesses the first change request from the general command queue 24. Then, it performs the following operations for the change request:

It checks whether concurrent processing of the found change request is possible in general. If concurrent processing is possible in general it checks whether the change request is dependent on a change request which a task process of the task processes 63 to 65 is already processing or which is in the internal command queue 71, 72 or 73 of one of the task processes 63 to 65.

If that is true, it puts the change request in the internal command queue of this task process and continues with the next change request form the general command queue 24. If the change request is not dependent, it returns this change request to the task process 63 to be executed by this task process.

If concurrent processing is not possible for the found change request, it puts the calling thread, i.e. the task process 63, in a wait state until all other task processes, i.e. the task processes 64 and 65, have completed the processing of all change requests which they have already started and which are in the task process related internal command queues 72 and 73, respectively. While a thread is waiting to process a change request which cannot be processed concurrently, all other threads which invoke the pop-task operation 70 of the task distributor 62 but which do not have change requests in the emphasized command queues will be put in wait-state. When all task processes have finished the work, the thread waiting to process a not concurrency enabled change request will be released from the wait-state and the change request will be returned to the task process to be processed.

When the processing of the change request is completed, all other threads will be released from the wait-state and will continue the work accordingly.

The invention claimed is:

1. A method of providing service data towards a set of two or more network elements of a telecommunication network, in particular to a set of two or more signaling transfer points, wherein a service provisioning system receives a plurality of change requests for said service data, and transmits update commands relating to the change requests to one or more network elements of the set of two or more network elements, the method comprising:
   receiving, at a service provisioning system, a plurality of change requests for service data, the change request concerning one or more of the network elements of the set of network elements,
   analyzing, at the service provisioning system, dependencies of at least one of (i) two or more change requests and (ii) two or more specific update requests from corresponding network elements with respect to the service data;
   aggregating, at the service provisioning system, at least one of independent change requests and independent update requests;
   concurrently processing at least one of the aggregated independent change requests and the aggregated independent update requests by two or more task processes of the service provisioning system working in parallel, whereby a task distributor checks whether at least one of the aggregated independent change requests and the aggregated independent update requests is dependent on at least one of processed aggregated independent change requests and processed aggregated independent update requests which have been one of (i) processed by one of the task processes and (ii) stored in a task processor command que assigned to one of the task processes, wherein the task distributor puts at least one of the aggregated independent change requests and the aggregated independent update requests in the command que of the task processor if the task processor detects a dependency; and
   transmitting from the service provisioning system to one or more network elements of the set of two or more network elements one or more concurrent update commands, the update commands forcing a parallel execution of at least one of the aggregated independent change requests and the aggregated independent update requests.

2. The method of claim 1, wherein the aggregating step is with respect to a context of the plurality of change requests and transmits an update command that forces a parallel execution of at least one of the aggregated equivalent independent change requests and the equivalent independent update requests.

3. The method of claim 1, wherein the service provisioning system processes at least one of the aggregated independent change requests and the aggregated independent updates request in parallel.

4. The method of claim 1 further comprising:
   executing a corresponding change in a service data master data base of the service provisioning system, if a change request is received;
   identifying one or more network elements of the set of network elements relevant to the change request; and
   creating a corresponding update request for each relevant network element.

5. The method of claim 4 further comprising:
   committing a change in the master data base when all relevant network elements have processed the corresponding update request.

6. The method of claim 1, wherein the update commands contain number portability data.

7. A service provisioning system for providing service data towards a set of two or more network elements of a telecommunication network, in particular towards a set of two or more signaling transfer points, wherein the service provisioning system comprises:
   a first communication unit configured to receive a plurality of change requests for the service data, the change requests concerning one or more of the network elements of the set of network elements;
   a second communication unit configured to transmit update commands relating to the change requests to one or more network elements of the set of two or more network elements;
   a controller configured to,
   (i) analyze at least one of the dependencies of two or more change requests and corresponding network element specific update requests with respect to service data,
   (ii) aggregate at least one of independent change requests and independent update requests,
   (iii) concurrently processing at least one of the aggregated independent change requests and the aggregated independent update requests by two or more task processes of the service provisioning system working in parallel, whereby a task distributor checks whether at least one of the aggregated independent change requests and the aggregated independent update requests is dependent on at least one of processed aggregated independent change requests and processed aggregated independent update requests which have been one of (a) processed by one of the task processes and (b) stored in a task processor command que assigned to one of the task processes, wherein the task distributor puts at least one of the aggregated independent change requests and the aggregated independent update requests in the command que of the task processor if the task processor detects a dependency; and (iv) transmit to one or several network elements of the set of network elements one or more concurrent update commands that forces a parallel execution of at least one of the aggregated change requests and the aggregated update requests.

8. A computer readable medium storing computer program instructions for performing a method of providing service data towards a set of two or more network elements of a telecommunication network, in particular to a set of two or more signaling transfer points, the computer program instructions defining the steps comprising:

receiving a plurality of change requests for said service data, the change requests concerning one or several of the network elements of the set of network elements;

analyzing the dependencies of at least one of (I) two or more change requests and (ii) two or more specific update requests from corresponding network elements with respect to service data;

aggregating at least one of independent change requests and the independent update requests;

concurrently processing at least one of the aggregated independent change requests and the aggregated independent update requests by two or more task processes of the service provisioning system working in parallel, whereby a task distributor checks whether at least one of the aggregated independent change requests and the aggregated independent update requests is dependent on at least one of processed aggregated independent change requests and processed aggregated independent update requests which have been one of (a) processed by one of the task processes and (b) stored in a task processor command que assigned to one of the task processes, wherein the task distributor puts at least one of the aggregated independent change requests and the aggregated independent update requests in the command que of the task processor if the task processor detects a dependency; and transmitting from the service provisioning system to one or several network elements of the set of network elements one or more concurrent update commands that force a parallel execution of at least one of the aggregated change requests and the aggregated update requests.

9. A method of providing service data towards a set of two or more network elements of a telecommunication network, the method comprising:

receiving, at a service provisioning system, a plurality of change requests from subscribers for service data, the plurality of change requests correlating to at least one network element;

analyzing, at the service provisioning system, the dependencies of two or more change requests from subscribers;

aggregating, at the service provisioning system, independent change requests; and transmitting update commands, from the service provisioning system to at least one network element, the update commands forcing parallel execution of the aggregated independent change requests.

* * * * *

UNITED STATES PATENT AND TRADEMARK OFFICE
CERTIFICATE OF CORRECTION

PATENT NO. : 7,630,480 B2  Page 1 of 1
APPLICATION NO. : 11/059603
DATED : December 8, 2009
INVENTOR(S) : Fleck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1331 days.

Signed and Sealed this

Twenty-first Day of December, 2010

David J. Kappos
*Director of the United States Patent and Trademark Office*